US007933724B2

(12) United States Patent
Drouart et al.

(10) Patent No.: US 7,933,724 B2
(45) Date of Patent: Apr. 26, 2011

(54) METHOD OF TRACKING THE PERFORMANCE OF AN INDUSTRIAL APPLIANCE

(75) Inventors: Caroline Drouart, Chatillon (FR); Thierry Roba, Bonefe (BE); Alain Donzel, Jouy en Josas (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 1521 days.

(21) Appl. No.: 11/297,842

(22) Filed: Dec. 8, 2005

(65) Prior Publication Data
US 2006/0155514 A1    Jul. 13, 2006

(30) Foreign Application Priority Data
Dec. 16, 2004    (FR) .................................... 04 53027

(51) Int. Cl.
G01R 21/00    (2006.01)
(52) U.S. Cl. ................. 702/60; 702/57; 702/61
(58) Field of Classification Search .................. 702/57, 702/60–61
See application file for complete search history.

(56) References Cited

U.S. PATENT DOCUMENTS
2002/0010563 A1* 1/2002 Ratteree et al. ............... 703/2
2003/0230994 A1  12/2003 Seddiki et al.
2005/0165581 A1   7/2005 Roba et al.

FOREIGN PATENT DOCUMENTS
FR    2 837 598    9/2003
FR    2 839 285    11/2003

OTHER PUBLICATIONS
French Search Report for FR 0453027, Jul. 8, 2005.
* cited by examiner Primary Examiner — Drew A Dunn
Assistant Examiner — Mi'schita' Henson
(74) Attorney, Agent, or Firm — Elwood L. Haynes

(57) ABSTRACT

Method of tracking the performance of an industrial appliance (E), in which an estimate ($W_e$) of the quantity representing the electrical power consumed is calculated, in real-time, using the model (M), based on the values of the set (F) of operating parameters of the industrial appliance (E), the difference between the measured value (W) of the electrical power consumed (W) and the estimated value ($W_e$) provided by the model (M) is calculated, to obtain the overconsumption value, based on a statistical test on the overconsumption variable, using the distribution of this variable, an overconsumption score is deduced from this corresponding to a probability of overconsumption ($p_1$) and an alarm is triggered if the probability of overconsumption ($p_1$) exceeds a given overconsumption probability threshold ($s_{p1}$), so constituting an overconsumption indicator.

11 Claims, 2 Drawing Sheets

METHOD OF TRACKING THE PERFORMANCE OF AN INDUSTRIAL APPLIANCE

This application claims the benefit of priority under 35 U.S.C. §119 (a) and (b) to French Application No. 0453027, filed Dec. 16, 2004, the entire contents of which are incorporated herein by reference.

BACKGROUND

The present invention relates to a method of tracking the performance of an industrial appliance, and a device for implementing such a method.

The invention applies in particular to air component separation units, using at least air, oxygen or nitrogen compressors.

The tracking of the performance of an industrial appliance, in particular of a compressor, is used to schedule the maintenance of the latter and monitor its effectiveness, and to steer the operational choice towards the best performing appliances.

It is desirable for the operator of this industrial appliance to have an indicator of the performance of this appliance, with which to reliably detect any degradation of the latter.

Thus, this indicator should make it possible to differentiate between a degradation of the state of the industrial appliance and a simple variation in the operating conditions.

To this end, the document FR 2 837 598 filed by the Applicant, describes a tracking method and device, in which the performance indicator of the appliance is in particular the electrical power consumed. Thus, the method consists in comparing the measurement of the electrical power consumed by an appliance with a model of this consumed power. When the ratio between these two quantities is greater than a threshold, an overconsumption alarm is triggered.

The model used can be of linear or non-linear type.

Today, the calibration of the model is normally performed over a set of data collected over a three-month period.

The diagnosis of overconsumption can be based on a model that has become inadequate at the moment of diagnosis, if the statistical behaviour of the set of measurements of the model input variables changes relative to the calibration period. These variables include in particular the temperature of the gas and of the cooling water, the suction and discharge pressures and the gas flow rate.

This change of behaviour can therefore lead to incorrect diagnoses, and lead to a failure to detect an overconsumption, or an incorrect detection of overconsumption, this latter case being more common.

The change in the statistical behaviour of the measurements can be due, for example, to extreme seasonal conditions, the outdoor temperature possibly, for example, being subject to wide variations, to a change in the level of the appliance or to a significant drift of a sensor.

The method described in the document FR 2 837 598 does not take account of these statistical changes, which causes a high rate of false alarms, leading to inadequate maintenance actions or the increasing of the detection threshold by the users, so reducing the effectiveness of the tool.

The object of the present invention is to improve the reliability of the compressor overconsumption diagnoses by taking account of the changes in the statistical behaviour of the measurements used as model input, in particular the measurements of gas and cooling water temperature, suction and discharge pressures and gas flow rate.

Thus, the object of the invention is to provide an overconsumption indicator, but also an invalidity indicator to suggest to the operator a need for relearning, taking into account these changes.

Another object of the invention is to make available additional information useful to the users for managing the installed base of compressors, in particular to facilitate the choice of the appliances to use or the relative load of each of them, by providing a compressor selection indicator.

To this end, the subject of the present invention is a method of tracking the performance of an industrial appliance in which, in a learning phase, over a reference period:
  a model for providing an estimate of the electrical power consumed based on the values of the set of operating parameters of the industrial appliance is calibrated,
  the distribution of a random variable representing the overconsumption, that is, the difference between the measured electrical power and the estimated value based on the model, is calibrated, and
in a real-time tracking phase:
  a set of operating parameters of the industrial appliance, and the value of the electrical power consumed by the appliance, are measured,
  an estimate of the quantity representing the electrical power consumed is calculated, in real-time, using the model, based on the values of the set of operating parameters of the industrial appliance,
  the difference between the measured value of the electrical power consumed and the estimated value provided by the model is calculated, to obtain the overconsumption value,
  based on a statistical test on the overconsumption variable, and using the distribution of this variable, an overconsumption score is deduced from this corresponding to a probability of overconsumption and constituting an overconsumption indicator,
  an alarm is triggered if the probability of overconsumption exceeds a given overconsumption probability threshold.

These provisions increase the reliability of the diagnosis and so reduce the false alarm rate.

Advantageously, the score for calculating the probability of overconsumption corresponds to the power of a statistical test on the overconsumption variable.

According to an embodiment, the probability of overconsumption corresponds to the probability that the overconsumption exceeds a given threshold.

Advantageously, in the real-time tracking phase, an invalidity indicator is calculated, representing the probability of validity or invalidity of the model, based on the values of the set of the operating parameters of the industrial appliance, the invalidity indicator being calculated from a score for which the determination means are calibrated in a learning phase over a reference period.

The invalidity or relearning indicator is used to indicate to the operator the need for relearning, for example via an alarm.

According to an embodiment, an alarm is triggered if the invalidity indicator exceeds a given invalidity probability threshold.

Advantageously, in the real-time tracking phase, an appliance selection indicator is calculated such as the marginal cost of the appliance, that is, the increase in electrical power consumed for a unit increase in the compressed flow rate at the current operating point, this indicator being calculated by a numerical derivation on the model.

The selection indicator is used by the operator to determine the best appliances to use.

The marginal costs associated with each of the compressors of an installation are used to improve the choice of their use.

According to an embodiment, at least a rolling measurement time window is taken into account, containing information measured over the duration of the window up to the current instant, to determine the overconsumption and/or the invalidity of the model.

Advantageously, the model is of non-linear type, including in particular at least one neurone network or local regression tools.

According to an embodiment, the set of input variables of the model, includes:
  the flow rate of the gas through the appliance,
  the suction pressure,
  the discharge pressure,
  the temperature of the cooling water, and
  the temperature of the gas at the input of the appliance.

Another subject of the invention is a system for implementing the above method, including:
  measurement means on the appliance,
  storage means for storing the corresponding data,
  calculation means,
  means of informing an operator and of checking,
  networked communication means linking the components of the system.

Advantageously, a recalibration of the model is triggered in the event of invalidity.

According to an embodiment, the method is carried out at regular intervals, in particular hourly.

In any case, the invention will be well understood from the description that follows, with reference to the appended diagrammatic drawing, representing, by way of nonlimiting example, an embodiment of a system according to the invention.

FIG. 1 diagrammatically represents an appliance and a tracking device according to the invention.

Figure 1:
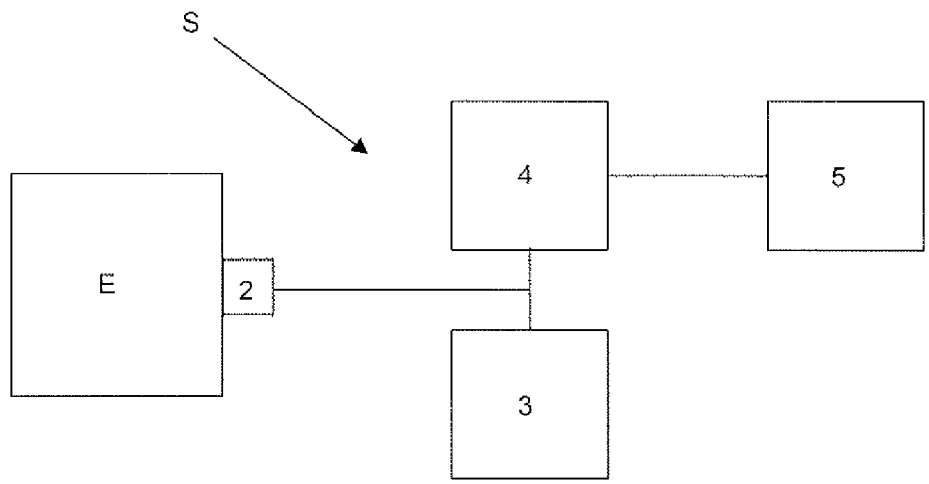

According to an embodiment represented in FIG. 1, a refrigerated compressor type industrial appliance E is associated with a system S for tracking the performance of an industrial appliance according to the invention.

A refrigerated compressor takes as input a gas at a suction pressure $P_{in}$, and compresses it to obtain as output a gas at a discharge pressure $P_{out}$ greater than the suction pressure.

The gas is at a temperature $T_g$.

This compressor is furthermore cooled by a coolant, in particular water, at a temperature $T_w$. This compressor, in order to carry out the compression, consumes electrical energy characterized by a consumed power W.

The system S includes measurement means 2 positioned on the appliance E for taking measurements. Storage means 3 are used to log the corresponding data, in particular in the form of hourly averages.

The measurements include in particular measurements of the electrical power consumed W, and a set of operating parameters of the appliance E.

The system S also includes calculation means 4.

The system S also includes operator information and checking means, in the form, for example, of a computer terminal 5.

The components of the system are linked by networked communication means.

Figure 2:
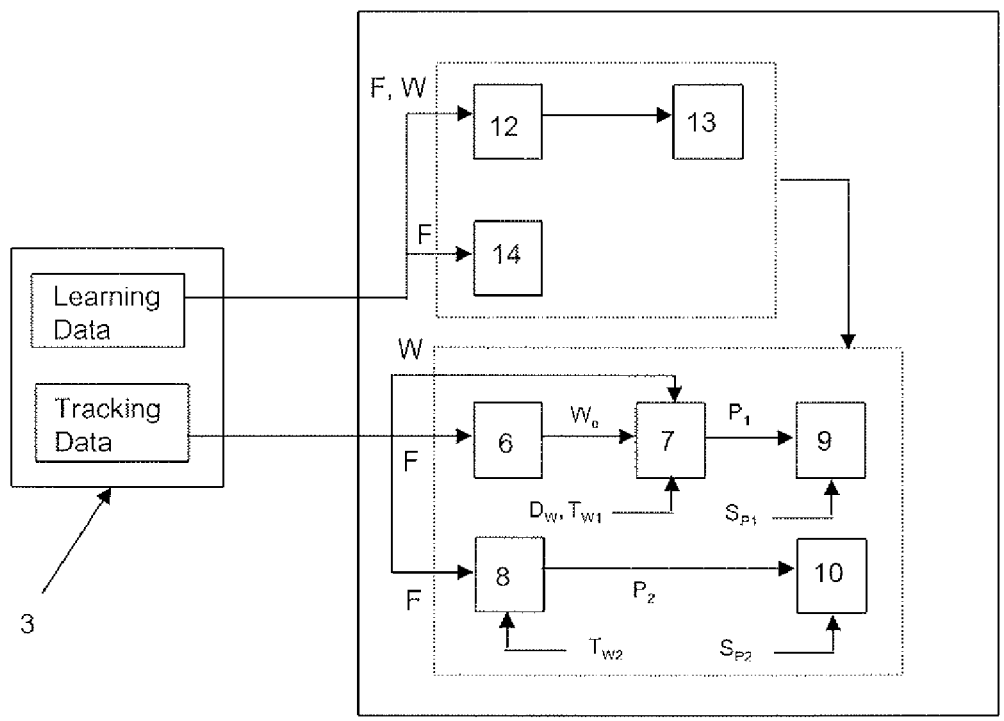
FIG. 2 is a diagrammatic view of the design of the calculation means.
Figure 3:
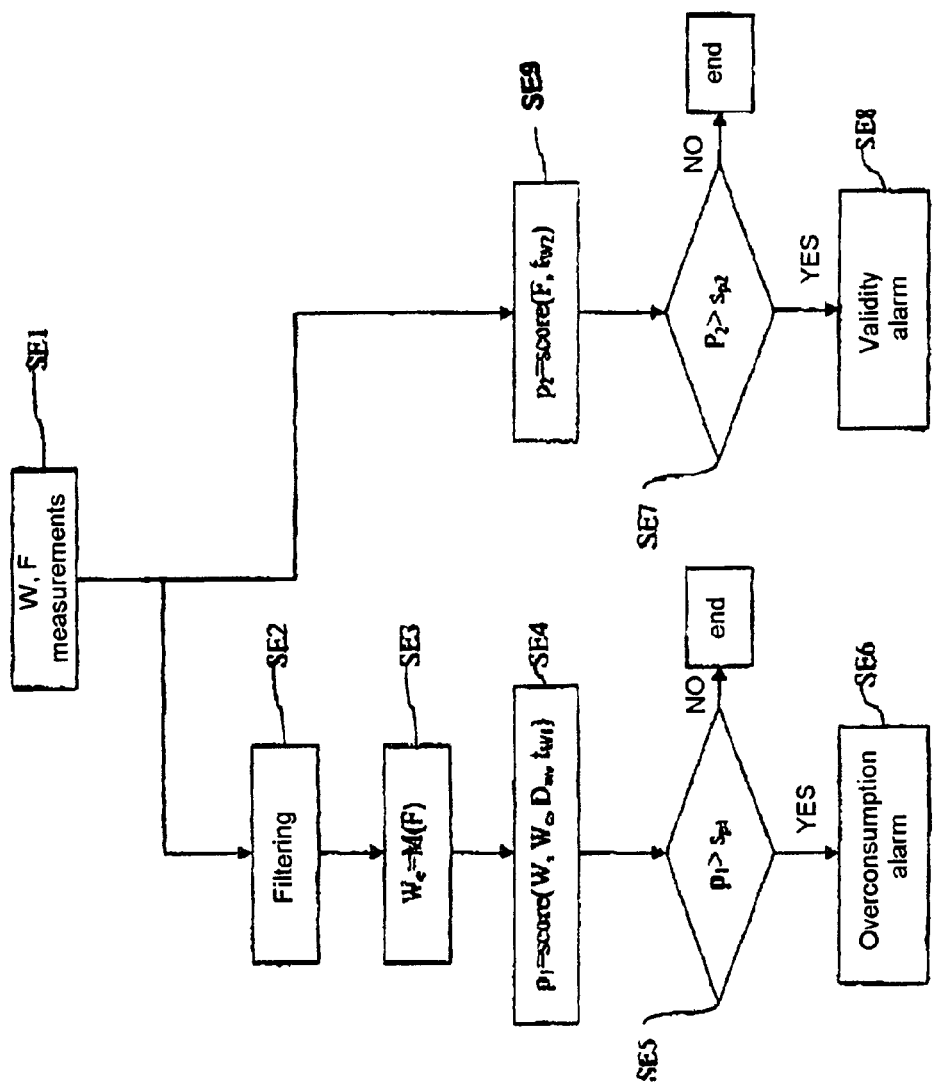
FIG. 3 represents a flow diagram of a method according to the invention, in the tracking phase.

FIG. 2 illustrates the elements used within the calculation means 4.

The calculation means 4 include:
  means 6 of estimating the value of the electrical power consumed $W_e$ by a model M, using a behavioural or statistical model to calculate, from a set F of input variables, an estimate $W_e$ of the electrical power consumed,
  first means 7 of determining a score $p_1$ corresponding to the probability of overconsumption, based on the estimate $W_e$ of the electrical power consumed, the value of the power consumed W measured by the measurement means 2, a first overconsumption threshold Dw, and a first rolling overconsumption time window $t_{w1}$ on which the first threshold must be reached to characterize an overconsumption,
  second means 8 of determining a score $p_2$ corresponding to the probability of invalidity of the model, based on the values measured for the input variables of the model, and a second rolling time window $t_{w2}$,
  first overconsumption alarm means 9, comparing the first score $p_1$ corresponding to the probability of overconsumption with a first overconsumption probability threshold $s_{p1}$, and
  second model M invalidity alarm means 10, comparing the second score $p_2$ corresponding to the probability of invalidity of the model with a second invalidity probability threshold $s_{p2}$,
these elements being used in the appliance performance tracking phase.

It should be noted that, in particular, the first means 7 of determining a score $p_1$ corresponding to the probability of overconsumption and the second means 8 of determining a score $p_2$ corresponding to the probability of invalidity of the model, can be implemented by configuring the score calculation components of the MdIntelligence software suite published by Miriad Technologies.

The model M is preferably of non-linear type, including, according to the variants, at least one neurone network or local regression tools. This model is calibrated in a preliminary learning phase over a reference period.

The set F of input variables of the model M, the values of which are obtained by the measurement means 2, include in particular, in this embodiment:
  the flow rate Q of the gas through the appliance E,
  the suction pressure $P_{in}$,
  the discharge pressure $P_{out}$,
  the temperature $T_w$ of the cooling water, and
  the temperature $T_G$ of the gas.

Thus, the calculation of the estimated power consumed can be represented by the relation:

$$We = M(F) = M(Q, P_{in}, P_{out}, T_W, T_G)$$

The calculation means also include:
  means 12 of calibrating the model M, from the values of the set F of the input variables measured over a reference learning period, and the value W of the measured power consumed,
  first means 13 of calibrating the first means 7 of determining the first score $p_1$, based on the power consumption values for the reference learning period, and
  second means 14 of calibrating the second means 8 of determining the second score $p_2$, based on the values of the set F of the input variables measured over a reference learning period,
the calibration means being used in the learning phase.

As a variant, the calculation means 4 also include data filtering means for eliminating, in the learning phase or in the real-time tracking phases, the data corresponding to errored sensor data.

In a learning phase, the model and the determination means are calibrated by the calibration means 9, 10, 12.

In such a learning phase, the overconsumption data is eliminated in order to obtain a model that approximates as closely as possible to the nominal operation of the appliance.

In a tracking phase, the following steps are carried out:

In a first step SE1, the value of the set F of the input variables of the model M and of the consumption W are supplied by the measurement means 2, directly, or via storage means 3.

In a second step SE2, the data supplied is filtered by the filtering means.

In a third step SE3, the value of the set F of the input variables is taken into account, the model M calculates an estimate $W_e$ of the electrical power consumed by the appliance.

In a fourth step SE4, it is then possible for the first determination means 7 to calculate a score $p_1$ corresponding to the probability of overconsumption, based on the estimate $W_e$ of the electrical power consumed, the value of the power consumed W measured by the measurement means 2, a first overconsumption threshold $D_w$ and a first overconsumption time window $t_{w1}$ over which the first threshold must be reached to characterize an overconsumption.

In a fifth step SE5, the first score $p_1$ corresponding to the probability of overconsumption is compared to a first overconsumption probability threshold $s_{p1}$, by the first overconsumption alarm means 9.

In a sixth step SE6, if the first score $p_1$ exceeds this first threshold $s_{p1}$, an overconsumption is detected and an alarm informs the user.

In parallel with the steps SE2 to SE6, in a seventh step SE7, the second score $p_2$ corresponding to the probability of invalidity of the model is calculated from the set of variables F, and a second rolling time window $t_{w2}$.

In an eighth step SE8, the second score $p_2$ is compared to a second invalidity probability threshold $s_{p2}$, by the second model M invalidity alarm means 10.

In a ninth step SE9, if the second score $p_2$ exceeds this second threshold $s_{p2}$, an invalidity of the model is detected and an alarm notifies the user of this, to prompt the latter to carry out a new learning phase.

In an optional tenth step, not shown in FIG. 2, the user can undertake a new learning or recalibration phase to obtain a valid model.

Thus, the overconsumption diagnosis is established via a first score $p_1$, that is, a true probability value between 0 and 1, a score of 0 indicating a zero risk of overconsumption and a score of 1 indicating a high risk of overconsumption.

The concept of overconsumption is defined, over a time band, above an overconsumption probability threshold $s_{p1}$ set by the user.

In this embodiment, a modelling of the distribution of the overconsumption variable is used. This modelling is calibrated during the learning phase and characterizes the distribution of the overconsumptions.

The score $p_1$ corresponds to the power of a test on the overconsumption, that is, the probability of being in overconsumption mode if overconsumption is indicated by the measurements and the model.

The tracking method as described is used to detect the presence of overconsumption by using three user parameters:

a rolling overconsumption time window $t_{w1}$ for example, over a period of 24 hours, this rolling window containing all the hourly information over the duration of the window.

an overconsumption threshold $D_w$, for example a level of 300 kilowatts.

an alarm triggering threshold $s_{p1}$, that is, a value between 0 and 1 for triggering an alarm based on the value of a score, for example, a level of 0.5.

The overconsumption diagnosis is established every hour, based on the parameters described above.

Regarding the model M invalidity diagnosis, this diagnosis is based on the second score $p_2$, which constitutes an invalidity indicator to alert the user when the model used and calibrated over a given learning period becomes inadequate relative to the sensor data used for the diagnosis.

A second score $p_2$ is a real probability value between 0 and 1, the value 0 indicating that the model can be applied with total confidence, the value 1 indicating that the model has a very high probability of not being applicable.

The tracking method as described is used to determine whether the model is valid by using two user parameters:

a rolling overconsumption time window $t_{w2}$, for example over a period of 24 hours, this rolling window containing all the hourly information over the duration of the window, an alarm triggering threshold $s_{p2}$, that is, a value between 0 and 1 for triggering an alarm based on the value of a score, the threshold value $s_{p2}$ being advantageously around 0.95 to 0.98.

The invalidity indicator $p_2$ is used in particular to check that the operational data used for the overconsumption diagnosis is not too far removed from the learning domain.

If the user observes, via this indicator, that the operational data is too long outside the learning domain, a relearning or an intervention on the sensor in case of uncontrolled sensor drift must be considered.

This indicator $p_2$ is therefore used to obtain very useful information on the validity of the model in relation to the prepared diagnoses.

It should be noted that the invalidity indicator $p_2$ indicates that recalibration is needed only when the input measurements of the model change statistical behaviour, and not when the consumed power measurement changes.

Advantageously, to allow a user to perform a more accurate tracking of the appliance, the deviation of the consumption of the appliance E relative to the theoretical curves supplied by the manufacturer is calculated, by the difference between these curves stored in the storage means 3 and the measured values.

Furthermore, the marginal cost for each compressor of an industrial unit is calculated, this information being used by the user to improve the choice of use of the latter.

The marginal cost constitutes a compressor selection indicator when a number of compressors are available on the same industrial unit.

The marginal cost is expressed as the cost of compressing a volume plus or minus about the current operating point, that is, the derivative of the power consumed relative to the gas flow rate.

The electrical power consumed is expressed:

$$W = \frac{QR_w \ln\left(\frac{P_{out}}{P_{in}}\right)}{\eta}$$

with:
- W: Electrical power consumed [kW]
- Q: Gas flow rate [Nm³/h]
- R: $1.0304 \cdot 10^{-4}$ [kWh/(Nm³·K)]
- $T_w$: Cooling water temperature [°K]
- $P_{in}$: Suction pressure, before the filter [bar]
- $P_{out}$: Discharge pressure [bar]
- $W_e$: Estimated power consumption [kW]
- $\eta$: Isothermal efficiency of the compressor
- $\eta_e$: Estimated isothermal efficiency of the compressor The estimation by the model M of the consumed power is expressed:

$$W_e = \frac{QRT_w \ln\left(\frac{P_{out}}{P_{in}}\right)}{\eta_e}$$

According to the linear embodiment disclosed in the document FR 2 837 598, the estimated isothermal efficiency of the compressor is considered as a linear law, that is:

$$W_e = \frac{QRT_w \ln\left(\frac{P_{out}}{P_{in}}\right)}{AQ + B\frac{P_{out}}{P_{in}} + CT_w + D}$$

The marginal cost is then expressed:

$$\frac{dW_e}{dQ} = \frac{W_e}{Q}\left(1 - \frac{AQ}{\eta_e}\right)$$

in which $W_e/Q$ is the specific cost.

The drawback of this method is the low accuracy in the non-linear areas of the efficiency.

In the embodiment according to the invention, better accuracy is obtained by positive and negative numerical derivation on the non-linear model M.

The improved accuracy of the marginal cost calculation provides for a better choice of the right compressors, the marginal cost constituting a better selection indicator.

Obviously, the invention is not limited to the preferred embodiments described above by way of nonlimiting examples; on the contrary, it covers all the variants in the context of the claims below.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method of tracking the performance of an industrial appliance in which, in a learning phase, over a reference period, said method comprising:
   a) calibrating a model for providing an estimate of the an electrical power consumption based on the values of a set of operating parameters of the industrial appliance;
   b) calibrating the distribution of a random variable representing overconsumption, wherein said overconsumption variable comprises the difference between the a measured electrical power consumption by the industrial appliance and the estimated value based on the model; and
   c) performing in a real-time tracking phase:
      i) measuring a set of operating parameters of the industrial appliance, and the electrical power consumed by the industrial appliance,
      ii) calculating an estimate of the quantity representing the electrical power consumed is calculated, in real-time, using the model, based on the values of the set of operating parameters of the industrial appliance,
      iii) calculating the overconsumption value by taking the difference between the measured value of the electrical power consumed and the estimated value provided by the model,
      iv) calculating an overconsumption indicator based on a statistical test on the overconsumption variable, using the distribution of said overconsumption variable, thereby deducing an overconsumption score corresponding to a probability of overconsumption and thereby constituting an overconsumption indicator,
      v) triggering an alarm if the probability of overconsumption exceeds a given overconsumption probability threshold,
   wherein, in the real-time tracking phase, an invalidity indicator is calculated, representing the probability of validity or invalidity of the model, based on the values of the set of the operating parameters of the industrial appliance, the invalidity indicator being calculated from a score for which the determination means are calibrated in a learning phase over a reference period.

2. The method of claim 1, wherein the score for calculating the probability of overconsumption corresponds to the power of a statistical test on the overconsumption variable.

3. The method of claim 1, wherein the probability of overconsumption corresponds to the probability that the overconsumption exceeds a given threshold.

4. The method of claim 1, wherein an alarm is triggered if the invalidity indicator exceeds a given invalidity probability threshold.

5. The method of claim 1, wherein, in the real-time tracking phase, an appliance selection indicator is calculated wherein said appliance selection indicator comprises the marginal cost of the appliance, said marginal cost comprising the increase in electrical power consumed for a unit increase in the compressed flow rate at the current operating point, said indicator being calculated by a numerical derivation on the model.

6. The method of claim 1, wherein at least a rolling measurement time window is taken into account, containing information measured over the duration of the window up to the current instant, to determine the overconsumption and/or the invalidity of the model.

7. The method of claim 1, wherein the model is of non-linear type, including in particular at least one neurone network or local regression tools.

8. The method of claim 1, wherein the set of input variables of the model, includes:
   a) the flow rate of the gas through the appliance;
   b) the suction pressure;
   c) the discharge pressure;
   d) the temperature of the cooling water; and
   e) the temperature of the gas at the input of the appliance.

9. The method of claim 1, wherein a recalibration of the model is triggered in the event of invalidity.

10. The method of claim 1, wherein said method is carried out at regular intervals.

11. A system for implementing the method of claim 1, wherein said system includes:
   a) measurement means on the appliance;
   b) storage means for storing the corresponding data;
   c) calculation means;
   d) means of informing an operator
   e) networked communication means linking the components of the system.

* * * * *